(12) United States Patent
Abraham

(10) Patent No.: US 7,590,618 B2
(45) Date of Patent: Sep. 15, 2009

(54) SYSTEM AND METHOD FOR PROVIDING LOCATION PROFILE DATA FOR NETWORK NODES

(75) Inventor: Raji Abraham, Southlake, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 652 days.

(21) Appl. No.: 10/107,020

(22) Filed: Mar. 25, 2002

(65) Prior Publication Data
US 2005/0149468 A1    Jul. 7, 2005

(51) Int. Cl.
*G06F 17/30* (2006.01)

(52) U.S. Cl. ............... 707/3; 707/102; 707/103 R; 707/10; 707/200; 709/224; 709/225; 709/226

(58) Field of Classification Search ......... 707/101; 709/224, 225, 226
See application file for complete search history.

(56) References Cited

U.S. PATENT DOCUMENTS

| | | | |
|---|---|---|---|
| 4,780,821 A | 10/1988 | Crossley | 365/200 |
| 4,853,843 A | 8/1989 | Ecklund | |
| 4,951,192 A | 8/1990 | Chase, Jr. et al. | 364/200 |
| 5,247,683 A | 9/1993 | Holmes et al. | 395/700 |
| 5,263,164 A | 11/1993 | Kannady et al. | 395/700 |
| 5,282,273 A | 1/1994 | Ushio et al. | 395/325 |
| 5,339,435 A | 8/1994 | Lubkin et al. | 717/121 |
| 5,511,186 A * | 4/1996 | Carhart et al. | 707/2 |
| 5,581,764 A | 12/1996 | Fitzgerald et al. | 395/703 |
| 5,678,041 A * | 10/1997 | Baker et al. | 707/9 |
| 5,806,065 A * | 9/1998 | Lomet | 707/8 |
| 5,857,072 A | 1/1999 | Crowle | 709/203 |
| 5,867,714 A | 2/1999 | Todd et al. | |
| 5,909,581 A | 6/1999 | Park | 717/170 |
| 5,919,247 A | 7/1999 | Van Hoff et al. | 709/217 |
| 5,920,701 A | 7/1999 | Miller et al. | 709/228 |
| 5,950,010 A | 9/1999 | Hesse et al. | 717/178 |
| 6,085,188 A * | 7/2000 | Bachmann et al. | 707/3 |
| 6,119,122 A * | 9/2000 | Bunnell | 707/102 |

(Continued)

FOREIGN PATENT DOCUMENTS

WO    WO91/02313    2/1991

(Continued)

OTHER PUBLICATIONS

Shi et al., "An enterprise directory solution with DB2". 2000, IBM Systems Journal, vol. 39, No. 2, p. 360-383.*

(Continued)

*Primary Examiner*—Cam Y T Truong

(57) ABSTRACT

A system for providing relational data for a hierarchically-organized plurality of nodes is provided, such as for providing physical location data of a node in an enterprise network. The system includes a hierarchical database system storing network hierarchy data for the plurality of nodes, such as an LDAP database. A configuration repository system stores relational data associated with one or more of the nodes, such as the room and floor location of each node. The relational data of the configuration repository system is organized in a bottom-up order and the network hierarchy data of the hierarchical database system is organized in a top-down order, such that the location of a node in an organization can be determined by searching using an application programming interface that goes from the node location upwards through the network hierarchy.

8 Claims, 9 Drawing Sheets

U.S. PATENT DOCUMENTS

| | | | | |
|---|---|---|---|---|
| 6,131,120 | A * | 10/2000 | Reid | 709/225 |
| 6,138,153 | A | 10/2000 | Collins et al. | 709/221 |
| 6,195,794 | B1 | 2/2001 | Buxton | 717/108 |
| 6,205,579 | B1 | 3/2001 | Southgate | 707/203 |
| 6,226,784 | B1 | 5/2001 | Holmes et al. | 717/100 |
| 6,226,788 | B1 * | 5/2001 | Schoening et al. | 717/107 |
| 6,324,543 | B1 | 11/2001 | Cohen et al. | |
| 6,347,312 | B1 * | 2/2002 | Byrne et al. | 707/3 |
| 6,367,077 | B1 | 4/2002 | Brodersen et al. | 717/170 |
| 6,397,378 | B1 | 5/2002 | Grey et al. | 717/175 |
| 6,405,364 | B1 | 6/2002 | Bowman-Amuah | 717/101 |
| 6,418,554 | B1 | 7/2002 | Delo et al. | 717/170 |
| 6,490,722 | B1 | 12/2002 | Barton et al. | |
| 6,493,870 | B1 | 12/2002 | Madany et al. | 717/165 |
| 6,564,369 | B1 | 5/2003 | Hove et al. | 717/121 |
| 6,615,166 | B1 | 9/2003 | Guheen et al. | 703/27 |
| 6,640,317 | B1 | 10/2003 | Snow | 714/38 |
| 6,651,248 | B1 | 11/2003 | Alpern | |
| 6,687,731 | B1 | 2/2004 | Kavak | 718/105 |
| 6,704,747 | B1 * | 3/2004 | Fong | 707/104.1 |
| 6,744,450 | B1 | 6/2004 | Zimniewicz et al. | |
| 6,757,698 | B2 | 6/2004 | McBride et al. | |
| 6,834,301 | B1 * | 12/2004 | Hanchett | 709/223 |
| 6,847,827 | B2 | 1/2005 | Helm et al. | 455/509 |
| 2001/0034733 | A1 * | 10/2001 | Prompt et al. | 707/102 |
| 2001/0037339 | A1 * | 11/2001 | Harvey | 707/102 |
| 2002/0010700 | A1 * | 1/2002 | Wotring et al. | 707/100 |
| 2002/0113816 | A1 * | 8/2002 | Mitchell et al. | 345/734 |
| 2003/0009434 | A1 * | 1/2003 | Munn et al. | 707/1 |
| 2003/0055935 | A1 * | 3/2003 | Tarrant et al. | 709/223 |
| 2004/0044755 | A1 * | 3/2004 | Chipman | 709/223 |
| 2005/0197969 | A1 * | 9/2005 | McElroy et al. | 705/70 |

FOREIGN PATENT DOCUMENTS

| | | |
|---|---|---|
| WO | WO93/04426 | 3/1993 |

OTHER PUBLICATIONS

An Assessment of a Metric Space Database Index to Support Sequence Homology, Rui Mao, 2003, pp. 1-8.*

User Intention based Personalized Search : HPS (Hierarchical Phrase Serch), vol. 7, Apr. 2008, pp. 1-11.*

Chengzheng Sun and David Chen, "*A Multi-version Approach to Conflict Resolution in Distributed Groupware Systems,*" IEEE, Apr. 2000 (10 pages).

Kam-yiu Lam, Jiannong Cao, Chung-leung Pang and Sang H. Son, "*Resolving Conflicts with Committing Transactions in Distributed Real-time Databases,*" IEEE, pp. 49-58, 1997.

Susan Dart, "*Concepts in Configuration Management Systems,*" ACM, pp. 1-18, 1991.

Douglas B. Terry, Marvin M. Theimer, Karin Petersen, Alan J. Demers, Mike J. Spreitzer and Carl H. Hauser, "*Managing Update Conflicts in Bayou, a Weekly Connected Replicated Storage System,*" ACM, pp. 172-183, 1995.

Alexander, et al., System and Method for Integrating Software Management and Distribution, U.S. Patent Application filed Nov. 5, 1999, U.S. Appl. No. 09/435,300, pp. 1-45.

Richard S. Hall, Dennis Heimbigner, and Alexander L. Wolf, A Cooperative Approach to Support Software Deployment Using the Software Dock, Software Engineering Research Laboratory, University of Colorado, Software Engineering, 1999, pp. 1-10.

IBM Corporation, An Integrated Method for Installing Non-Integrated Software, IBM TDB Journal, Apr. 1998 [retrieved Mar. 21, 2002], retrieved from Software Patent Institute Database, pp. 1-9 (full text).

IBM Corporation, Internet Installation of Software Updates using a Web Browser, IBM TDB Journal, Nov. 1996 [retrieved Mar. 21, 2002], retrieved from Software Patent Institute Database, pp. 1-6 (full text).

InstallShield Software Corp. Ships InstallShield Express2.1, Business Wire, New York, Nov. 9, 1998 [retrieved Mar. 22, 2002], retrieved from ProQuest Data Base, pp. 1-4.

IEEE Spectrum, Apr. 1992, L. Brooks Hickerson et al., Managing Networked Workstations, pp. 55, 56, and 58.

ICL Technical Journal, vol. 7, No. 4, Nov. 1991, Oxford, GB, XP000268112, P. Barthram et al., Distribution Management—ICL's Open Approach, pp. 702-717.

ICL Technical Journal, vol. 7, No. 4, Nov. 1991, Oxford, GB, XP000268110, T. Gale, The Evolution Within ICL of an Architecture for Systems Management, pp. 673,685.

IBM Technical Disclosure Bulletin, vol. 32, No. 10A, Mar. 1990, Armonk, US, Reference Monitor—Location of Resource Access, p. 335.

1988 IEEE, Carl W. Symborski, Updating Software and Configuration Data in a Distributed Communications Network, pp. 331-337.

1988 IEEE, Carl W. Symborski, "*Updating Software and Configuration Data in a Distributed Communications Network*", pp. 331-337.

* cited by examiner

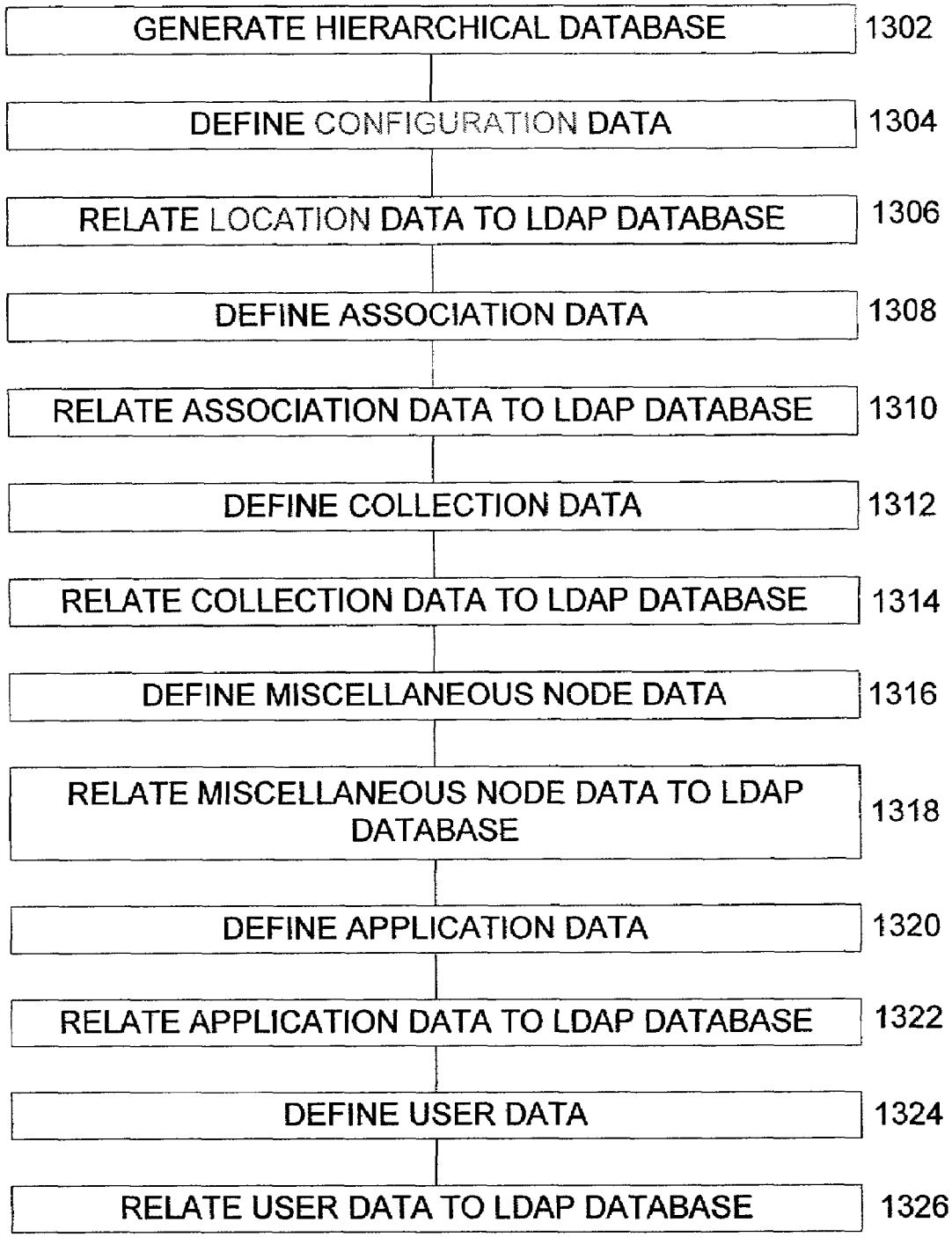
FIGURE 13    1300

SYSTEM AND METHOD FOR PROVIDING LOCATION PROFILE DATA FOR NETWORK NODES

RELATED APPLICATIONS

This application is related to U.S. Pat. Ser. No. 09/435,300, entitled "System and Method for Integrating Software Management and Distribution," filed Nov. 5, 1999.

FIELD OF THE INVENTION

The present invention pertains to the field of network information management. More specifically, the invention relates to a system and method for configuration information management that allows configuration data to be assigned in a relational database that is searchable in an inverse hierarchical manner.

BACKGROUND OF THE INVENTION

Systems for generating configuration data are known in the art. For example, the Lightweight Directory Access Protocol (LDAP) allows data relating to each node in a network to be generated and stored in a top-down hierarchical structure, such that the location of a node in the network can be determined based on one or more parent nodes. For example, the LDAP generates node location data in the format parent1/parent2/node, where parent1 and parent2 are also nodes that have a hierarchical location in the network that is "above" the node.

While LDAP and other network node data structuring systems allow nodes to be located relative to other nodes, they do not provide additional information about a node that is required in order to perform certain functions, such as to configure software for operation on the node. For example, a node may require access to a printer, but the printer that is physically located near the node cannot be determined without viewing a map having associated printer identification data. Likewise, the user of a node may require access to certain applications or files based on the user's function within the organization, but users having many different function may be located in the same location relative to a given parent node. This node-specific data must be determined for each user, and often requires an operator to be physically present in order to install software applications.

SUMMARY OF THE INVENTION

In accordance with the present invention, a system and method for providing configuration data for network nodes are provided that overcome known problems with systems and methods for determining configuration data that are location, application or user specific.

In particular, a system and method for providing configuration data are provided that use a hierarchical database generated using LDAP or other processes and a relational database that is synchronized to the hierarchical data, which can be searched in a reverse hierarchical order to determine location profile data for a node.

In accordance with an exemplary embodiment of the present invention, a system for providing relational data for a hierarchically-organized plurality of nodes is provided, such as for providing physical location data of a node in an enterprise network. The system includes a hierarchical database system storing network hierarchy data for the plurality of nodes, such as an LDAP database. A configuration repository system stores relational data associated with one or more of the nodes, such as the room and floor location of each node. The relational data of the configuration repository system is organized in a bottom-up order and the network hierarchy data of the hierarchical database system is organized in a top-down order, such that the location of a node in an organization can be determined by searching using an application programming interface that goes from the node location upwards through the network hierarchy.

The present invention provides many important technical advantages. One important technical advantage of the present invention is a system and method for providing configuration data that uses a hierarchical database to provide a network location of each node, and which synchronizes the hierarchical database with a relational database that stores profile data for each node based on one or more sets of data that are not related to the network hierarchy, such as physical location, the location of the user of the node within an organization, the applications that can be used on the node, or other suitable data. The relational database is synchronized to the hierarchical data, and application programming interfaces are provided that allow a reverse hierarchical order search to be used to locate data in the relational or hierarchical database.

Those skilled in the art will further appreciate the advantages and superior features of the invention together with other important aspects thereof on reading the detailed description that follows in conjunction with the drawings.

BRIEF DESCRIPTION OF THE SEVERAL VIEWS OF THE DRAWINGS

FIG. 13 is a flow chart of a method for generating relational data and associating the relational data to an hierarchical database in accordance with an exemplary embodiment of the present invention.

DETAILED DESCRIPTION OF THE INVENTION

Figure 1:
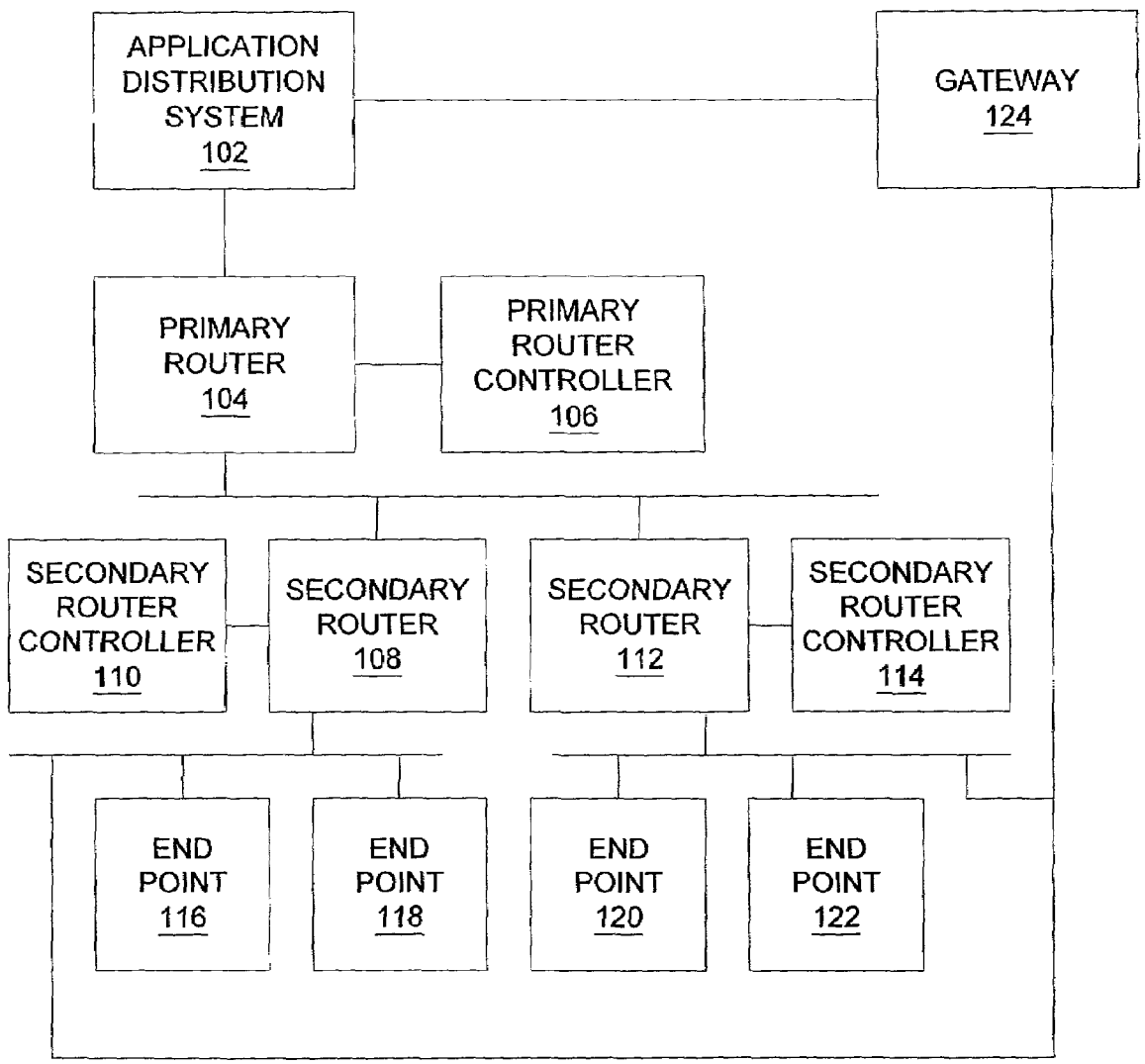
FIG. 1 is a diagram of a system for distributing software in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of a system 100 for distributing software in accordance with an exemplary embodiment of the present invention. System 100 can be used to efficiently distribute software in a very large enterprise, such as to thousands of geographically distributed workstations or nodes from a single distribution point.

System 100 includes application distribution system 102, which can be implemented in hardware, software, or a suitable combination of hardware and software, and which can be one or more software systems operating on a general purpose server platform. As used herein, a software system can include one or more objects, agents, lines of code, threads, subroutines, databases, application programming interfaces (APIs), web browser plug-ins, or other suitable data structures, source code (human readable), object code (machine readable), and can include two or more different lines of code or suitable data structures operating in two or more separate software applications, on two or more different processing platforms, or in other suitable architectures. In one exemplary embodiment, a software system can include one or more lines of code or other suitable software structures operating in a general purpose software application, such as an operating system, and one or more lines of code or other suitable software structures operating in a specific purpose software application. In another exemplary embodiment, a software system can be implemented as a distributed software system, on a different processing platform than that shown in the exemplary embodiments herein, or in other suitable manners.

Application distribution system 102 is used to distribute packages of software that have been assembled for installation on an endpoint, such as using an assembly system and method described in U.S. Pat. Ser. No. 09/435,300, entitled "System and Method for Integrating Software Management and Distribution," filed Nov. 5, 1999, which is hereby incorporated by reference for all purposes. An endpoint can be a suitable processor platform, such as a laptop computer, a desktop computer, a workstation, a handheld device, a peripheral component such as a scanner, a printer, a copy machine, a fax machine or other suitable systems having a processor and processing capabilities.

Application distribution system 102 is coupled to primary router 104. As used herein, the term "couple," and its cognate terms such as "couples" and "coupled," can include a physical connection (such as through a copper conductor), a virtual connection (such as through randomly assigned memory locations of a data memory device), a logical connection (such as through one or more logical devices of a semiconducting circuit), a hypertext transfer protocol connection, other suitable connections, or a suitable combination of such connections. In one exemplary embodiment, systems and components are coupled to other systems and components through intervening systems and components, such as through an operating system of a general purpose server platform.

Application distribution system 102 provides files to primary router 104 for distribution to a plurality of endpoints. Application distribution system 102 coordinates the transmission of files used for configuring the software applications so that the distribution of the software applications to the endpoints is optimized. Primary router 104 is used to distribute the files as a plurality of messages in a modified publish and subscribe format, where the address for each message is assigned by application distribution system 102 based on the location of the endpoints.

Primary router 104 can be implemented in hardware, software, or a suitable combination of hardware and software, and can be one or more software systems operating on a general purpose server platform. Primary router 104 is an application layer router, as opposed to a hardware layer router. In one exemplary embodiment, in the Open Systems Interconnection (OSI)networking model, an application layer router would operate in layer 7 of the OSI model, whereas a physical layer router would operate in layer 1 of the OSI model. Thus, primary router 104 can operate on a suitable network node that is normally not used for software distribution, such as a server, a workstation, or other suitable processing platforms. In this manner, primary router 104 can be selected based on an optimal network architecture, as opposed to using an existing hardware layer router that may not be optimally located for distribution of software in an enterprise.

Primary router controller 106 is coupled to primary router 104, and performs control of primary router 104. In one exemplary embodiment, primary router controller 106 can be implemented in hardware, software, or a suitable combination of hardware and software, and can be one or more software systems operating on a general purpose server platform. Primary router controller 106 receives messages from primary router 104 and stores the messages for subsequent transmission to other nodes in the distribution system. In one exemplary embodiment, primary router controller 106 stores messages that include one or more files, and then provides the messages to primary router 104 for transmission at predetermined times, upon the occurrence of predetermined events, or in other suitable manners. The processor resources of primary router 104 can thus be optimized, so as to facilitate rapid distribution of software throughout the enterprise from a centralized location.

Primary router 104 is coupled to secondary router 108 and secondary router 112, such as through a network. Secondary router 108, secondary router 112, secondary router controller 110 and secondary router controller 114 can each be implemented in a manner similar or identical to that of primary router 104 and primary router controller 106, respectively. Secondary router 108 and secondary router 112 receive messages containing files for distribution to endpoints from primary router 104. The messages are addressed and distributed in a modified publish and subscribe process that uses the connection between secondary router 108 and primary router 104 as a first channel, and the connection between secondary router 112 and primary router 104 as a second channel. In this manner, primary router 104 distributes messages to secondary router 108 and secondary router 112 by posting those messages to the corresponding channel. Thus, files to be distributed through primary router 104 and secondary router 108 and secondary router 112 can be addressed using a conventional publish and subscribe process where the message is addressed by identifying the channel to which the message should be routed, but where the "subscription" process is performed using standard network messaging functions.

Secondary router controller 110 and secondary router controller 114 are used to store and process the messages and files as they are received, so that the messages and files can then be routed through secondary router 108 and secondary router 112, respectively, in accordance with router processor capacity, bandwidth of the communications media, at predetermined times, in response to predetermined events, or based on other suitable criteria.

Secondary router 108 is coupled to endpoint 116 and endpoint 118, and secondary router 112 is coupled to endpoint 120 and endpoint 122, such as by a single network connection, two network connections as shown, or other suitable communications media. Files are transmitted in the form of messages from secondary router 108 to endpoints 116 and 118, and from secondary router 112 to endpoints 120 and 122, such as upon receipt of notification of a predetermined event, after the expiration of a period of time, or in accordance with other suitable routing commands. In addition, the addressing of messages from secondary router 108 to endpoint 116 and endpoint 118 is performed by using a modified publish and subscribe message format. In this manner, application distribution system 102 can address files for distribution to endpoints 116 through 122 by identifying the first channel to secondary router 108 or secondary router 112, and the second channel to the endpoint, where the existing network messaging software is used to install the files on the endpoints from the secondary routers. Thus, system 100 uses a modified publish and subscribe message format to distribute software in an enterprise, so as to deploy software systems on a large number of endpoints. System 100 allows the transmission of large numbers and sizes of files over application layer routers and communications media that does not overload the processor capabilities of the routers, and that does not overload the bandwidth of the communications media. In this manner, application distribution system 102 can sequence the distribution of files in a manner that optimizes the existing system architecture. Although two layers of routers are shown in this exemplary embodiment, a suitable number of routers can be used be used between endpoints. Likewise, the number of routers between application distribution system 102 and each endpoint does not need to be uniform. For example, some endpoints might be reached through a single router and associated publish and subscribe channels, whereas other endpoints might be reached through 10 or more router layers.

Gateway 124 can be implemented in hardware, software, or a suitable combination of hardware and software, can be one or more software systems operating on a general purpose server platform. In one exemplary embodiment, gateway 124 is an existing server node in a network that is used as an application layer gateway for the purpose of facilitating enterprise software distribution. The enterprise software distribution process may require response messages to be generated by endpoints 116 through 122 and transmitted back to application distribution system 102 or other suitable systems. Gateway 124 can be used to return messages in response to event notification messages or other data transmitted through primary router 104 to secondary routers 108 or 112 so as to trigger subsequent transmission of messages to endpoints 116 and 122. Gateway 124 is coupled to endpoints 116 through 122, such as through the network connection between secondary routers 108 and secondary router 112, or by other suitable means. Thus, gateway 124 can be used to receive and coordinate message transmissions from endpoints 116 through 122 to application distribution system 102 or other suitable systems.

In operation, system 100 can be used to distribute software in an enterprise that includes a large number of nodes in geographically dispersed areas. System 100 allows software to be transmitted to each node using modified publish and subscribe messaging that uses existing network communications systems and allows file transmission to be coordinated through timing or in response to events, and to optimize the use of application layer router processing capabilities and bandwidth of network connections. In this manner, application distribution system 102 can determine an optimal processor and bandwidth loading based on the distribution of software to endpoints, and can further address files for distribution to endpoints in a manner that does not require those files to be individually addressed, broadcast, or that does not require the endpoints to determine the files that are needed and to subscribe to channels to receive such files. In this manner, application distribution system 102 can provide a sequence of file distribution based on optimized routing practices, such as by transmitting messages to endpoints to determine configuration information and then sequencing specific software to endpoints based on geographical, functional, or other parameters and network bandwidth and resources.

Figure 2:
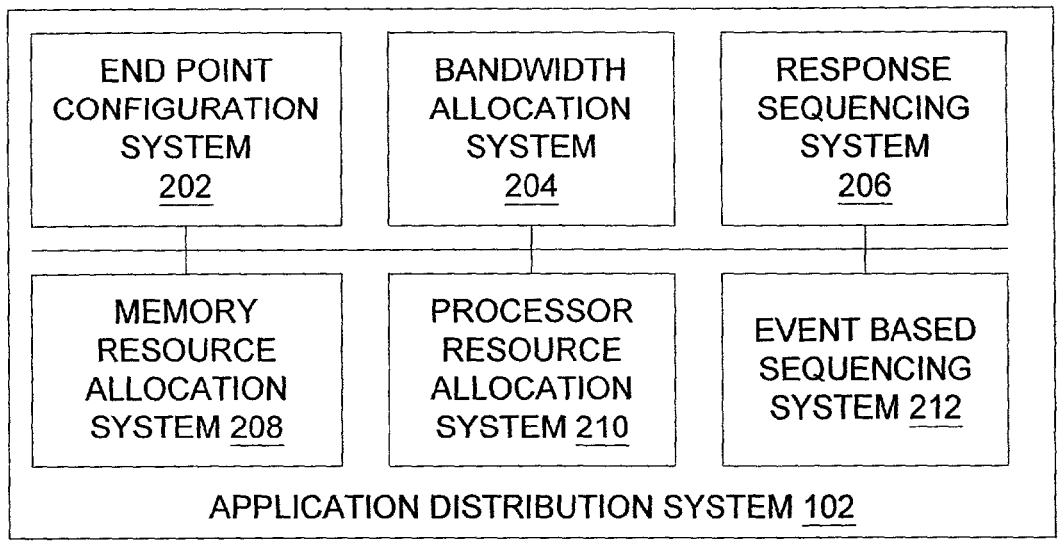
FIG. 2 is a diagram of a system for distributing applications in an enterprise in accordance with an exemplary embodiment of the present invention.

FIG. 2 is a diagram of a system 200 for distributing applications in an enterprise in accordance with an exemplary embodiment of the present invention. System 200 includes application distribution system 102 and endpoint configuration system 202, bandwidth allocation system 204, response sequencing system 206, memory resource allocation system 208, processor resource allocation system 210 and event based sequencing system 212, each of which can be implemented in hardware, software, or a suitable combination of hardware and software, and which can be one or more software systems operating on a general purpose server platform.

Endpoint configuration system 202 includes endpoint configuration data for a plurality of endpoints in an enterprise. In one exemplary embodiment, endpoint configuration system 202 can include a database of processor configuration data that identifies the location of each processor, the applications that are required for each processor, the groups to which the processor operators are assigned, processors having multiple operators, and other suitable information. This processor configuration data is used by endpoint configuration system 202 to identify software that should be transmitted to each endpoint in an enterprise software distribution event.

Bandwidth allocation system 204 receives message routing data and provides bandwidth allocation data in response to the message routing data. In one exemplary embodiment, bandwidth allocation system 204 tracks bandwidth availability for a software distribution path based on message routing data, such as by using modified publish and subscribe routing in which each channel that is required to transmit a message to an endpoint is contained in the address for the message, in addition to the total number of endpoints that will be receiving the message. Bandwidth allocation system 204 can generate bandwidth availability data, such as in response to a query from application distribution system 102 or other suitable systems, so as to allow such other systems to sequence messages accordingly. Likewise, bandwidth allocation system 204 can receive message data that includes priority data, and can sequence the messages based upon available bandwidth and message routing data contained in the modified publish and subscribe format.

Response sequencing system 206 receives message routing data and provides response sequencing data in response to the message routing data. In one exemplary embodiment, response sequencing system 206 tracks bandwidth availability for a response message path based on message routing data, such as by determining the maximum response message load that can be generated when a plurality of endpoints generate a response to a transmitted message. Response sequencing system 206 can determine bandwidth availability or processor capacity data, and can provide a time, event, or priority ranking for transmitted messages to ensure that the response messages can be transmitted to the required destination.

Memory resource allocation system 208 receives message routing data and provides memory resource allocation data in response to the message routing data. In one exemplary embodiment, memory resource allocation system 208 tracks memory resource availability for a software distribution path based on message routing data, such as using modified publish and subscribe routing in which messages need to be stored at application routers in response to bandwidth availability or other variables. Memory resource allocation system 208 can generate memory resource availability data, such as in response to a query from application distribution system 102 or other suitable systems, so as to allow such other systems to sequence messages accordingly. Likewise, memory resource allocation system 208 can receive message data that includes priority data, and can sequence the messages based upon available memory resources and message routing data contained in the modified publish and subscribe format.

Processor resource allocation system 210 receives message routing data and provides processor resource allocation data in response to the message routing data. In one exemplary embodiment, processor resource allocation system 210 tracks processor resource availability for a software distribution path based on message routing data, such as using modified publish and subscribe routing in which each channel required to transmit a message to an endpoint is contained in the address for the message, in addition to the total number of endpoints that will be receiving the message. Processor resource allocation system 210 can generate processor resource availability data, such as in response to a query from application distribution system 102 or other suitable systems, so as to allow such other systems to sequence messages accordingly. Likewise, processor resource allocation system 210 can receive message data that includes priority data, and can sequence the messages based upon available processor resources and message routing data contained in a modified publish and subscribe format.

Event based sequencing system 212 generates event based sequencing control data for inclusion in a message. In one exemplary embodiment, event based sequencing system 212 can determine whether the occurrence of an event is required prior to transmitting a message. For example, receipt of a "WakeOnLAN" message may be required before files are transmitted, or receipt of a first file may be required prior to transmission of a second file. Event based sequencing system 212 can include event confirmation control data that requires receipt of confirmation data from application distribution system 102, nodes, or other system components before transmitting a message. Likewise, event based sequence system 212 can receive event notification from systems operating on a router or router controller, such as timer systems, bandwidth availability monitors, processor loading monitors or other suitable systems.

In operation, system 200 allows files to be organized as messages, and messages to be sequenced for distribution to a plurality of processors in an enterprise. System 200 allows the distribution of files to be organized so that files are transmitted in accordance with optimal bandwidth allocation, optimal memory resource allocation, optimal processor resource allocation, optimal response sequencing allocation for response gateways or other response systems, and optimal event based sequencing. System 200 thus allows files to be sequenced so as to facilitate file distribution in an optimal time period.

Figure 3:
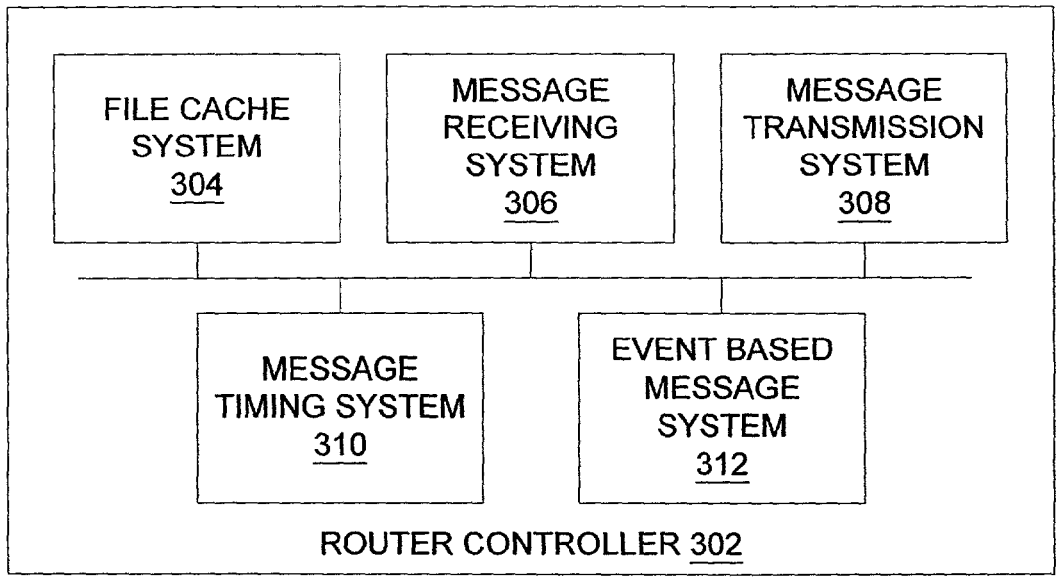
FIG. 3 is a diagram of a system for controlling an application layer router in accordance with an exemplary embodiment of the present invention.

FIG. 3 is a diagram of a system 300 for controlling an application layer router in accordance with an exemplary embodiment of the present invention. System 300 includes router controller 302 and file cache system 304, message receiving system 306, message transmission system 308, message timing system 310 and event based message system 312, each of which can be implemented in hardware, software, or a suitable combination of hardware and software, and which can be one or more software systems operating on a general purpose server platform.

File cache system 304 receives messages, including one or more files, and stores the messages for subsequent transmission to one or more endpoints. File cache system 304 can store the messages in a random access memory, a magnetic storage media, or other suitable storage media based on the expected amount of time that a given file will be stored. In one exemplary embodiment, file cache system 304 can determine whether a file will be stored for a predetermined amount of time or until an event occurs, and can store the file in a storage medium based upon the expected amount of storage time for the file.

Message receiving system 306 receives messages including routing data, such as publish and subscribe distribution data, and payload data that can include files for distribution and corresponding control data, event messages that are used to trigger event based message distribution (such as timing messages, processor availability messages, bandwidth availability messages, or other suitable messages), and other suitable payload data. Message receiving system 306 then performs a message preparation function on the message. In one exemplary embodiment, a message preparation function can include extracting payload data for processing by message timing system 310, event based message system 312, or other suitable systems, preparing the message for retransmission to another router through message transmission system 308, or other suitable message preparation functions.

Message transmission system 308 assembles address data and payload data into a message for transmission by a router. In one exemplary embodiment, the message transmission system 308 can assemble files into payload data and append publish and subscribe address data based on control data received from message timing system 310, event based message system 312, message receiving system 306, or other suitable systems. In another exemplary embodiment, message transmission system 308 can transmit data to another router or router controller, such as bandwidth availability data, processor capacity data or other suitable messages.

Message timing system 310 performs timing functions for distribution of messages. Message timing system 310 can sequence messages in accordance with timing control data associated with each message, can start one or more timers based on receipt of messages with associated timer control data, and can perform other suitable functions.

Event based message system 312 tracks messages with event based transmission functions and generates message transmission control data upon the occurrence of an event. In one exemplary embodiment, event based message system 312 can store a list or other suitable structures with the events, and can monitor event messaging to determine whether an event has occurred. In another exemplary embodiment, event based message system 312 can perform queries or other suitable functions to determine whether an event has occurred. Event based message system 312 can further compile files and other data into a message to be transmitted upon the occurrence of an event.

In operation, system 300 provides control for an application layer router in a software distribution system for an enterprise. System 300 allows modified publish and subscribe messaging to be used to distribute messages in an enterprise software distribution system, in which messages are published based upon priority, time, bandwidth capacity, processor capacity, events, or other occurrences. System 300 thus allows the existing network to be used in an enterprise to distribute software to a plurality of endpoints in a manner that optimizes the software distribution process.

Figure 4:
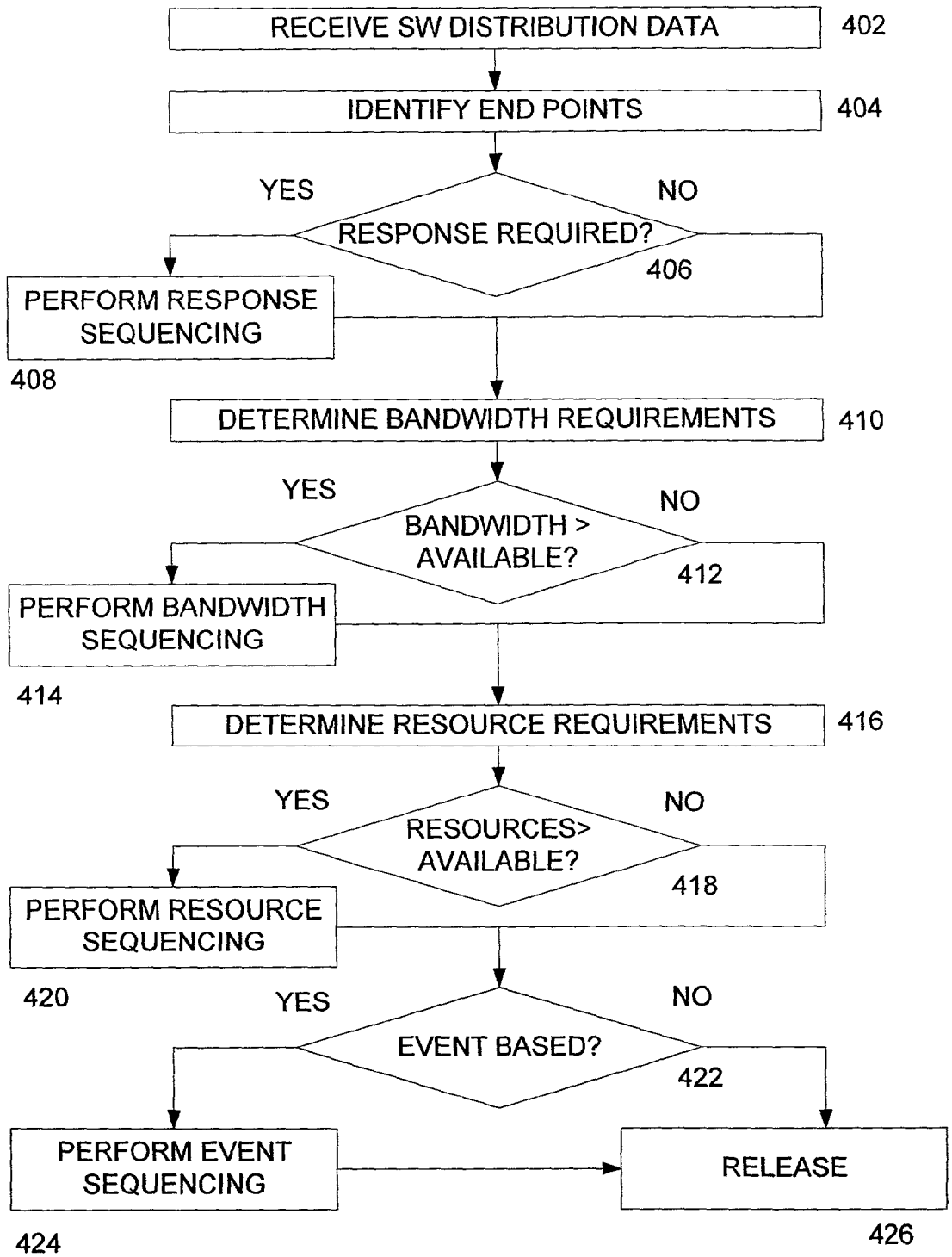
FIG. 4 is a flowchart of a method for distributing software using modified publish and subscribe messaging, in accordance with an exemplary embodiment of the present invention.

FIG. 4 is a flowchart of a method 400 for distributing software using modified publish and subscribe messaging, in accordance with an exemplary embodiment of the present invention. Method 400 allows messages to be sequenced based upon resources, bandwidth, responses, events, or other suitable criteria.

Method 400 begins at 402, where software distribution data is received. In one exemplary embodiment, the software distribution data can include data identifying suites of software to be distributed, where the suites further comprise a plurality of software components, where each component includes a plurality of files. Likewise, the software distribution data can identify classes of machines that should receive different software suites and components based upon the function of the node, the location of a node, the geographic location of a node, the location of a node within an organization, or other suitable functions. The method then proceeds to 404.

At 404, the endpoints associated with the software distribution data are identified. In one exemplary embodiment, endpoints can be classed based upon various geographical data, organizational data, functional data, or other suitable data, where the network address for the endpoint is correlated based on these various factors. After the endpoints are identified, the method proceeds to 406.

At 406, it is determined whether a response is required to the message. In one exemplary embodiment, a message can include a control command that causes the processor to perform a function, such as activating an Intel WakeOnLAN Network Interface Card that causes a computer that is off to activate, an inventory scan function that causes the computer to transmit a list of files stored on the computer, a heartbeat query that causes a computer to respond if it is active, or other suitable responses. If it is determined at 406 that a response is not required, the method proceeds to 410. Otherwise, the method proceeds to 408 where a response to sequencing is performed. In one exemplary embodiment, the response to sequencing can include an analysis of the priority in which responses should be received, the bandwidth available between endpoints that will be receiving the response message and the application requiring the response, such as an application distribution system 102, the processing capacity of an application layer gateway or other suitable systems that are used to coordinate transmission of responses to the application, and other suitable constraints or factors. The method then proceeds to 410.

At 410, the bandwidth requirements for the messages are determined. In one exemplary embodiment, bandwidth requirements can be based on total bandwidth required for a group of messages, the bandwidth required at various points and the message transmission path to endpoints, or other suitable bandwidth requirements. The method then proceeds to 412.

At 412, it is determined whether the amount of bandwidth required is greater than available bandwidth. If the amount of bandwidth required is not greater than available, the method proceeds to 416. Otherwise, the method proceeds to 414 where bandwidth sequencing is performed. In one exemplary embodiment, bandwidth sequencing can be performed by using the priority of messages, the priority of endpoints, can be based on an analysis of bottleneck constraints, such as areas in which the bandwidth is a constraint on distribution for other areas, or other suitable factors. The method then proceeds to 416.

At 416, resource requirements are determined for distribution of the messages throughout the enterprise. In one exemplary embodiment, resource requirements can include the processor requirements for receiving and transmitting messages, storing messages, bandwidth requirements, or other suitable resource requirements. The method then proceeds to 418.

At 418, it is determined whether the amount of resources required for distribution of the messages exceeds available resources. If the amount does not exceed available resources, the method proceeds to 422. Otherwise, the method proceeds to 420 where resource sequencing is performed. In one exemplary embodiment, resource sequencing can include ordering messages based upon the priority of the message, based upon the amount of resources required, based upon bottleneck resource constraints, such as areas in which the processor capacity or storage availability will limit the distribution of the messages or other suitable resource sequencing. The method then proceeds to 422.

At 422, it is determined whether any event based messages are included. If no event based messages are included, the method proceeds to 426 and terminates. Otherwise the method proceeds to 424 where event based sequencing is performed. In one exemplary embodiment, events can be sequenced based upon priority of the event, a sequence number for events, or other suitable data. The method then proceeds to 426 where the message sequencing is released.

In operation, method 400 allows a plurality of messages including file messages and control data messages to be sequenced so as to allow enterprise distribution of software to be performed over a network. Method 400 uses existing network resources to distribute software from one or more centralized locations to a plurality of endpoints in an efficient manner, so as to optimize available network resources to allow the software to be efficiently distributed.

Figure 5:
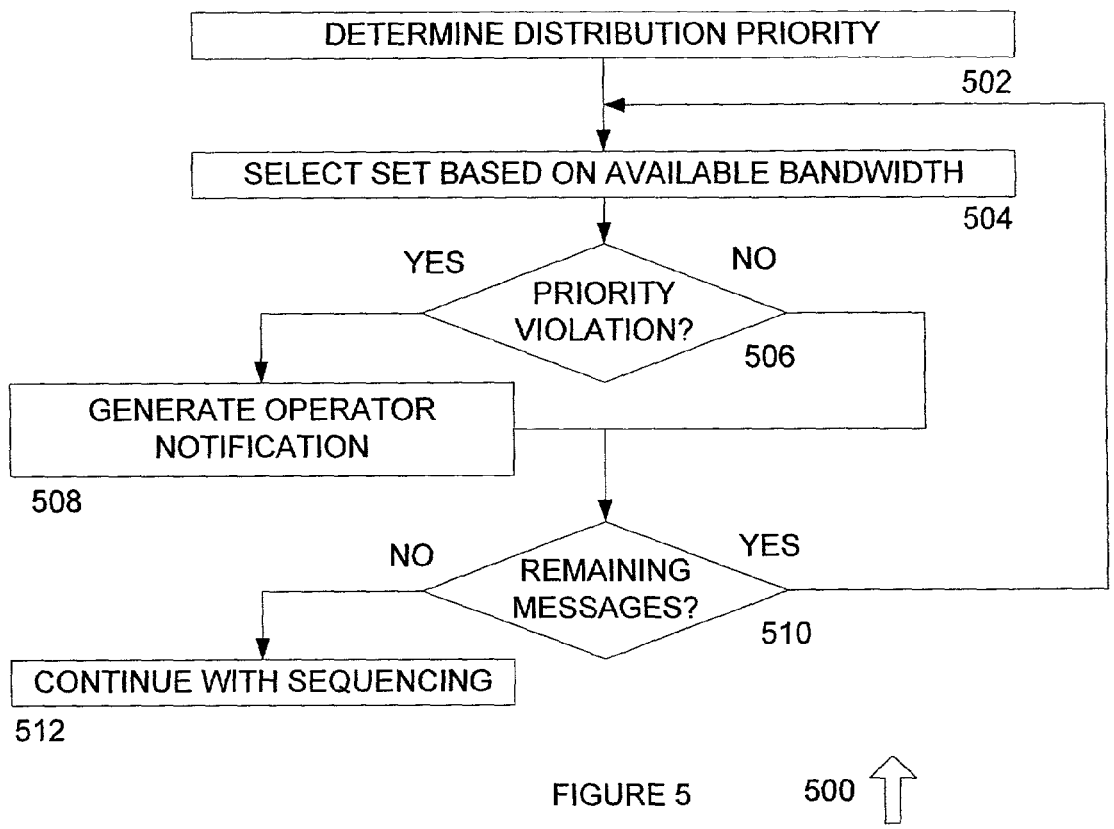
FIG. 5 is a flowchart of a method for performing bandwidth sequencing of messages in accordance with an exemplary embodiment of the present invention.

FIG. 5 is a flowchart of a method 500 for performing bandwidth sequencing of messages in accordance with an exemplary embodiment of the present invention. Method 500 allows a plurality of messages to be sequenced based upon bandwidth requirements in an enterprise software distribution system.

Method 500 begins at 502 where distribution priority is determined. In one exemplary embodiment, distribution priority can be determined based upon the software suite, the software component of a suite, the location of an endpoint, the function of an endpoint, a function that has to be performed by the endpoint, a function that has to be performed by an application layer router or gateway, or other suitable criteria. The method then proceeds to 504.

At 504, a message set is selected based upon the available bandwidth. In one exemplary embodiment, the message set can be selected by taking the highest priority messages in sequence until all available bandwidth has been allocated. In another exemplary embodiment, the message set can be selected based on priority in conjunction with other factors, such as the location of associated endpoints with priority messaging, bandwidth bottlenecks at certain locations, or other suitable functions. The method then proceeds to 506.

At 506, it is determined whether a priority violation has occurred. In one exemplary embodiment, a priority violation can include a sequencing of messages that results in a message not being transmitted at a required time, such as prior to transmission of other messages, in conjunction with transmission of other messages, or at other suitable times. If a priority violation has not occurred, the method proceeds to 510. Otherwise the method proceeds to 508 where operator notification is generated. In one exemplary embodiment, operator notification can request that the operator correct the priority violation, such as by reviewing the messages and selecting an operator override sequence. The method then proceeds to 510.

At 510, it is determined whether any remaining messages need to be sequenced. If messages remain, the method returns to 504. Otherwise, the method proceeds to 512 where sequencing of messages continues, such as response sequencing, resource sequencing, or event sequencing.

In operation, method 500 allows messages to be sequenced based upon available bandwidth so as to optimize message distribution in an enterprise software distribution system. Method 500 allows priority to be assigned to messages so as to ensure that messages are received in a predetermined order, such as messages that may require a response to be generated or other suitable messages.

Figure 6:
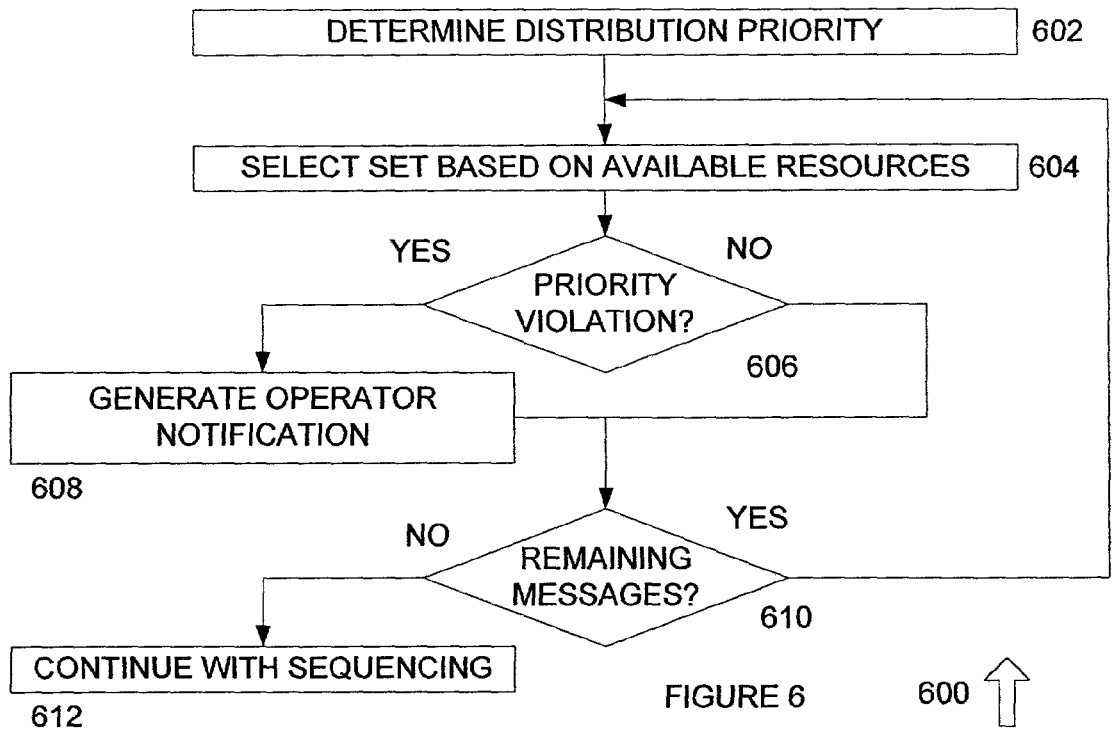
FIG. 6 is a flowchart of a method for performing resource sequencing of messages in accordance with an exemplary embodiment of the present invention.

FIG. 6 is a flowchart of a method 600 for performing resource sequencing of messages in accordance with an exemplary embodiment of the present invention. Method 600 allows a plurality of messages to be sequenced based upon resource requirements in an enterprise software distribution system.

Method 600 begins at 602 where distribution priority is determined. The method then proceeds to 604, where a message set is selected based upon the available resources. In one exemplary embodiment, the message set can be selected based on processor requirements for processing the message, for generating responses, for processing responses, for operating timers, for storing files, processor capacity bottlenecks at certain locations, or other suitable resource sequencing functions. The method then proceeds to 606.

At 606, it is determined whether a priority violation has occurred. If a priority violation has not occurred, the method proceeds to 610. Otherwise the method proceeds to 608 where operator notification is generated. The method then proceeds to 610.

At 610, it is determined whether any remaining messages need to be sequenced. If messages remain, the method returns to 604. Otherwise, the method proceeds to 612 where sequencing of messages continues, such as response sequencing, bandwidth sequencing, event sequencing, or other suitable sequencing.

In operation, method 600 allows messages to be sequenced based upon available resources so as to optimize message distribution in an enterprise software distribution system. Method 600 allows priority to be assigned to messages so as to ensure that messages are received in a predetermined order, such as messages that may require a response to be generated or other suitable messages.

Figure 7:
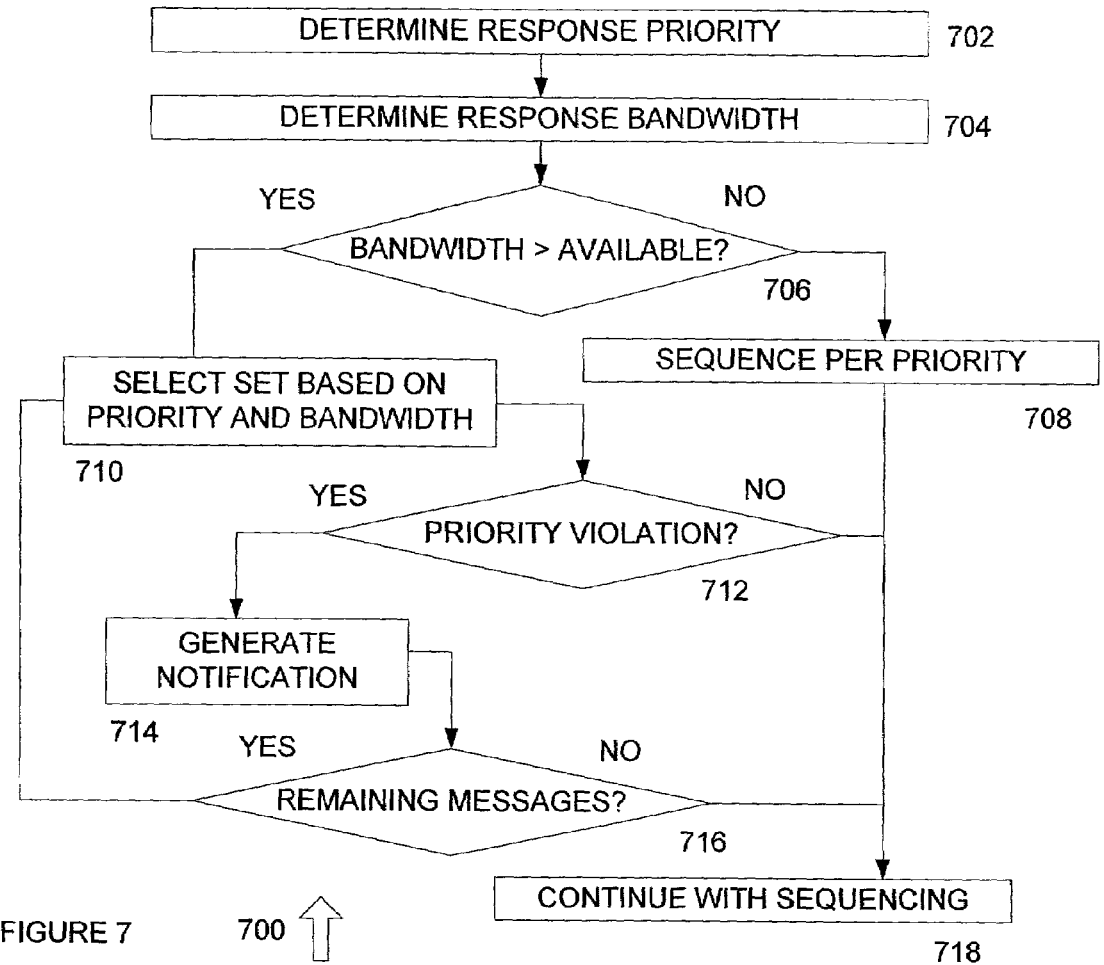
FIG. 7 is a flowchart of a method for performing response sequencing of messages in accordance with an exemplary embodiment of the present invention.

FIG. 7 is a flowchart of a method 700 for performing response sequencing of messages in accordance with an exemplary embodiment of the present invention. Method 700 allows a plurality of messages in an enterprise software distribution system to be sequenced based upon responses that may be generated after the distribution of messages to an endpoint.

Method 700 begins at 702 where a response priority is determined. In one exemplary embodiment, a response priority may be based upon control commands such as execution of an Intel WakeOnLAN Network Interface Card so that a processor is turned on prior to the transmission of messages to that processor. In this exemplary embodiment, the priority of the WakeOnLAN command would be greater than the priority for any other message. After the response priority is determined the method proceeds to 704.

At 704, response bandwidth is determined. In one exemplary embodiment, response bandwidth can include the available bandwidth between a plurality of endpoints and an application layer gateway, such as where the gateway is used to coordinate the transmission of response messages from the endpoints back to an application, such as an application distribution system 102. After the response bandwidth is determined, the method proceeds to 706.

At 706, it is determined whether the bandwidth required for the response is greater than available bandwidth. In one exemplary embodiment, the bandwidth can be determined based upon maximum response bandwidth required, the response bandwidth required at system bottlenecks, or other suitable bandwidth. If it is determined that the bandwidth is not greater than available, the method then proceeds to 708, where the messages are sequenced in accordance with the message priority. Otherwise, the method proceeds to 710.

At 710, a set of messages is selected based upon priority and bandwidth constraints. In one exemplary embodiment, bandwidth sequencing may have already been performed such that predetermined sets are available for response priority sequencing. In another exemplary embodiment, priority sequencing can be performed in conjunction with bandwidth sequencing, and the transmission sets can be selected based upon overlapping compatible sets. The method then proceeds to 712.

At 712, it is determined whether a priority violation has occurred. If a priority violation has not occurred, the method proceeds to 718. Otherwise, the method proceeds to 714 where a notification is generated requesting operator assistance. The method then proceeds to 716.

At 716, it is determined whether any remaining messages need to be sequenced. If remaining messages are available, the method returns to 710. Otherwise, the method proceeds to 718 where sequencing for other factors is performed, such as resource sequencing or event sequencing.

In operation, method 700 is used to perform response sequencing in an enterprise software distribution system, so as to prevent responses that may be generated following transmission of messages including files or control data from overloading system capacity. In this manner, system 700 prevents data loss from occurring, such as from undelivered messages, which can result in improper installation of files in an enterprise software distribution system.

Figure 8:
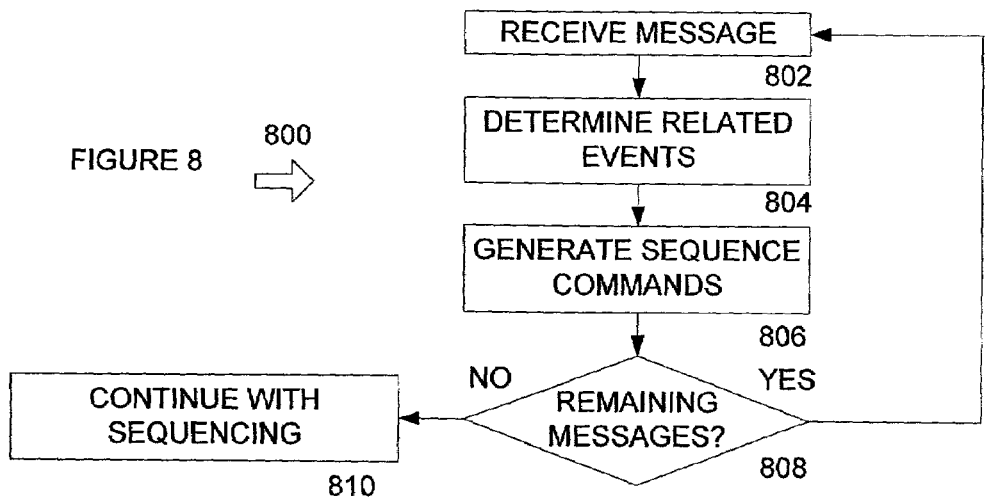
FIG. 8 is a flowchart of a method for performing event based sequencing of messages for an enterprise software distribution system in accordance with an exemplary embodiment of the present invention.

FIG. 8 is a flowchart of a method 800 for performing event based sequencing of messages for an enterprise software distribution system in accordance with an exemplary embodiment of the present invention. Method 800 begins at 802 where a message is received. In one exemplary embodiment, the message can include file data, control data or other suitable data that identifies a message transmission route, a message transmission endpoint, functional requirements, or other suitable data. The method then proceeds to 804.

At 804, it is determined whether there are any related events required for the message. In one exemplary embodiment, installation of components, bandwidth availability, processor availability, or other suitable events may need to occur before a message is transmitted, such as to prevent inadvertent non-delivery of the message, to ensure that predetermined events occur prior to transmission of the message, or for other suitable purposes. The method then proceeds to 806.

At 806, sequence commands are generated. In one exemplary embodiment, message sequencing can be generated based upon relative events, such that messages are sequenced after all messages have been processed. In another exemplary embodiment, messages can be assigned a sequence based upon absolute events, such as transmission of a message after a processor is on, transmission of a message after an operating system has been installed, or other suitable events. The method then proceeds to 808.

At 808, it is determined whether remaining messages need to be sequenced for event related sequencing. If any messages are remaining, the method returns to 802. Otherwise, the method proceeds to 810 where the process continues with any remaining sequencing, such as bandwidth sequencing, response sequencing, or resource sequencing.

In operation, method 800 allows messages to be sequenced based upon events that may be required prior to transmission of a message. Method 800 thus allows modified publish and subscribe messaging to be used in an enterprise software distribution system so as to allow the address of an endpoint to be determined centrally and for the message to be sequenced to the endpoint without inadvertent receipt of a message prior to predetermined events.

Figure 9:
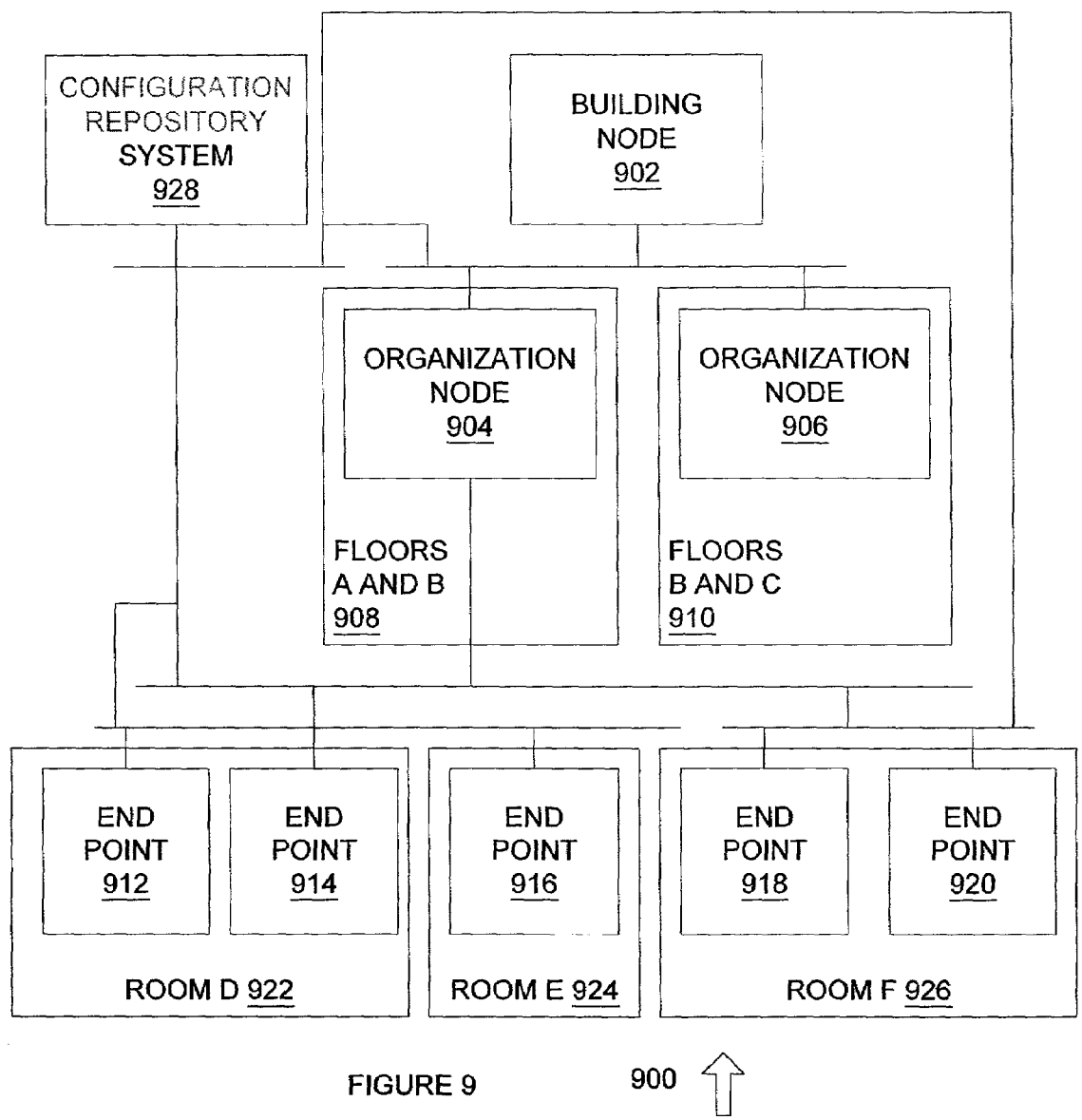
FIG. 9 is a diagram of a system for providing location profile data for nodes in an enterprise network in accordance with an exemplary embodiment of the present invention.

FIG. 9 is a diagram of a system 900 for providing configuration data for nodes in an enterprise network in accordance with an exemplary embodiment of the present invention. System 900 allows configuration data to be provided for nodes in a network where such configuration data can be inherited by nodes that are not in related classes or otherwise in an hierarchical relationship.

System 900 includes building node 902, which can be implemented in hardware, software, or a suitable combination of hardware and software, which can be one or more software systems operating on a general purpose server platform. Building node 902 can be a server providing network communications services or other suitable services to nodes within a building, a group of buildings, or at other suitable locations.

Building node 902 is coupled to organization nodes 904 and 906, such as through a network connection. Organization nodes 904 and 906 can be implemented in hardware, software, or a suitable combination of hardware and software, and can be one or more software systems operating on general purpose server platforms and providing network communications services or other suitable services to organizations within a building or at other suitable locations. In this exemplary embodiment, organization node 904 is providing services to end points on floors A and B 908. Likewise, organization node 906 is providing services to end points on floors B and C 910. As can be seen in this exemplary embodiment, organization node 904 and organization node 906 both provide services to entities on floor B, however such entities are not related through an organization node. Thus, an entity on floor B could either inherit from organization node 904 or organization node 906, which makes identification of floor B in an hierarchical architecture, such as the lightweight directory access protocol (LDAP), unworkable.

Organization node 904 is coupled to end point 912 and end point 914 in room D 922, to end point 916 in room E 924, and to end point 918 and end point 920 in room F 926. The relationship between room D 922, room E 924, and room F 926 and floors A and B 908 is similarly non-hierarchical, as each room can only be on one floor. Thus, while organization node 904 can encompass two floors, each room can only encompass one floor. Thus, inheritance of a floor from organization node 904 to any of end points 912 through 920 would not be facilitated in an LDAP database or in other suitable hierarchical databases.

Configuration Repository system 928 is coupled to building node 902, organization node 904, organization node 906, and end points 912 through 920, and can provide a relational database architecture or other suitable architectures for providing inheritance of physical location data, association location data, application version data, user customization data, or other data that may similarly be nonhierarchical and a hierarchical database architecture for providing inheritance of data that may be hierarchical. In one exemplary embodiment, configuration repository system 928 can interface with a relational database or other suitable nonhierarchical database for receiving and updating physical location data, association location data, application location data, user location data, or other data that may similarly be nonhierarchical. Configuration Repository system 928 can interface with a hierarchical database such as an LDAP database, and can receive additional data for each node in a manner that allows reverse inheritance of data elements, so that a node hierarchy can be traversed from the bottom up until a requested data element is found.

In this exemplary embodiment, configuration repository system 928 allows the floor for an end point 912 to be determined by traversing a database from end point 912 to organization node 904, where the floor for end point 912 is provided through data related to organization node 904. Likewise, building node 902 can be associated with other geographical or functional data, such as a state or a network communication services provider. In this manner, relational data, hierarchical data, or other suitable data stored in Configuration Repository system 928 can be used to supplement hierarchical data provided through a relational database, a hierarchical database such as an LDAP database or other suitable databases, to allow data for nodes to be stored that may be required in operation, to install software in an enterprise, or in other suitable situations.

In one exemplary embodiment, in an enterprise software distribution system, it may be necessary to know the room in which an end point is located, the floor on which an end point is located, an association that an end point may have such as the role a user can play or the applications that a machine can have, a collection that holds multiple values in a specific order that can be referred to by any node, application data such as a buffer size for communication, the default number of retries, the default location of the log files, or other suitable data, user preferences such as the size, location, color of windows, or other suitable data. Configuration Repository system 928 allows such information to be provided in a relational database that is synchronized with hierarchical data that can be generated using LDAP or other similar directory or network driven processes. In this manner, software can be configured for distribution to end points without requiring operator assisted installation of the software on site, such as by allowing a centralized software distribution system to determine the closest printer, the applications that are to be installed on a machine, the function of the operator of the machine, or other suitable data that is relational and nonhierarchical.

In one exemplary embodiment, configuration repository system 928 can be hosted on a relational database or other suitable nonhierarchical database at a central node and on a LDAP or other suitable hierarchical database locally at distributed nodes. In this exemplary embodiment, configuration repository system 928 can be predominantly used for reading, accessing and other suitable functions at distributed nodes but for reading, accessing, writing, updating and other suitable functions at a central node. Further, information on the relational database or other suitable database at the central node or other suitable node can be transmitted to the LDAP or other suitable hierarchical database. In this manner, the LDAP is synchronized with the relational database.

Figure 10:
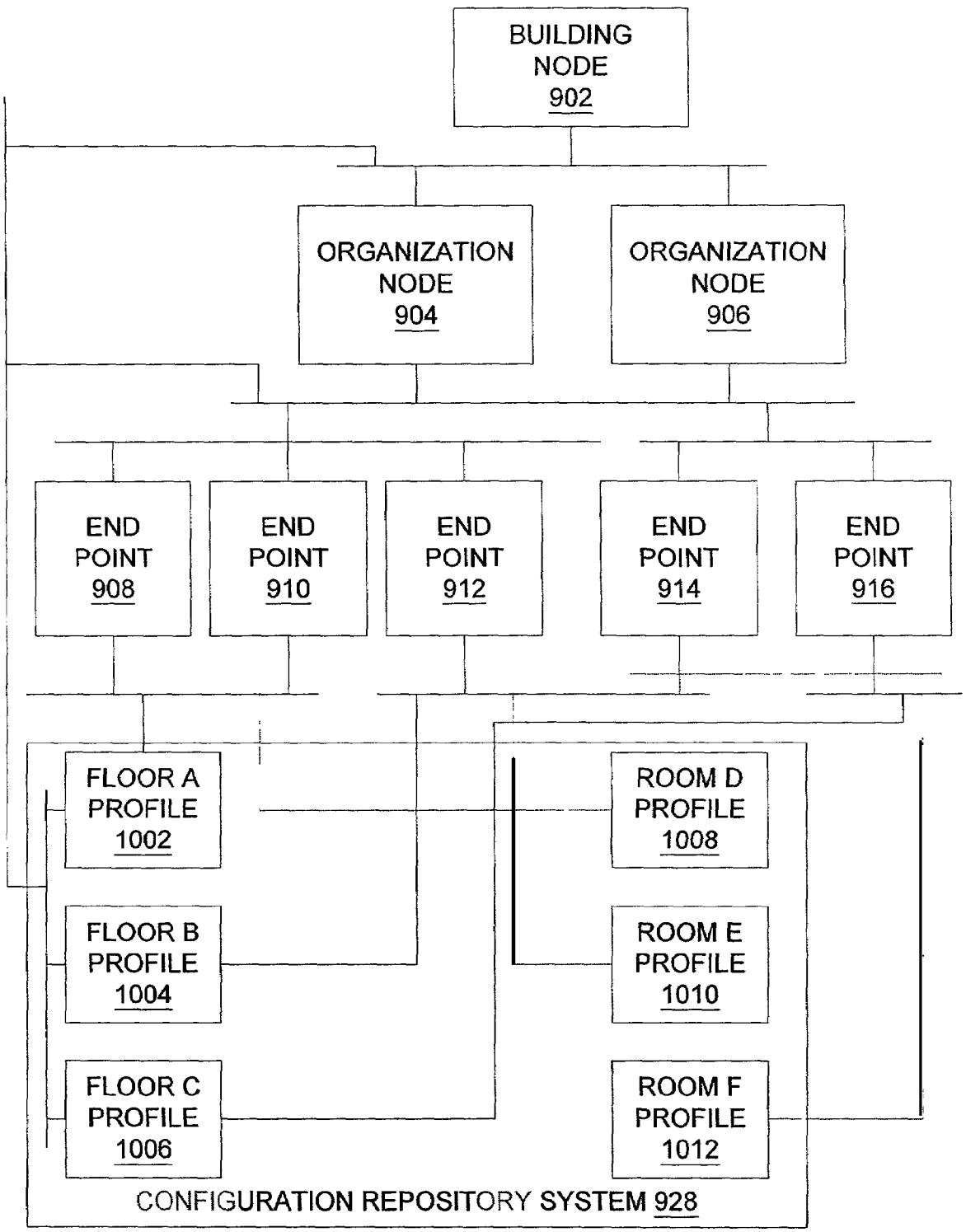
FIG. 10 is a diagram of a system showing relational node entities and hierarchical node entities in accordance with an exemplary embodiment of the present invention.

FIG. 10 is a diagram of a system 1000 showing relational node entities and hierarchical node entities in accordance with an exemplary embodiment of the present invention. System 1000 provides an example of relational connections to nodes that would not be obtainable through a hierarchical database, a directory driven database, or other directory or network driven processes.

System 1000 includes Configuration Repository system 928 with floor A profile 1002, floor B profile 1004, floor C profile 1006, and room D profile 1008, room E profile 1010, and room F profile 1012, each of which can be implemented in hardware, software, or a suitable combination of hardware and software, and which can be logical entities in a relational database, hierarchical database such as an LDAP, or other suitable database in addition to building node 902, organization node 904 and organization node 906, and end points 912 through 920. As shown in FIG. 10, floor A profile 1002 relates to end point 912, end point 914, and organization node 904. Thus, floor A profile 1002 can be identified in a relational database for each of end point 912, end point 914, and organization node 904, or can be provided in a relational database for organization node 904 and with related hierarchical data for end points in floor A profile 1002. In one exemplary embodiment, floor A profile 1002 can be identified in a hierarchical database such as an LDAP for each of end point 912, end point 914, and organization node 904, or can be provided in a hierarchical database such as an LDAP for organization node 904 and with related hierarchical data for end points in floor A profile 1002

Likewise, room D profile 1008 is related to end points 912 and 914, but not to organization node 904. In this manner, the determination of the room in which an end point is located can be determined by traversing the hierarchical organization database from the bottom up, such as by using an application programming interface (API) that first checks the relational data associated with an end point for data, and then moves up the hierarchy and checks the relational data associated with organizational node 904 for the data if it was not present in the relational data for the end point. Relocation of end point 912 to a different room would thus require updating the relational database, and could not be implemented using an automated process, such as a directory driven process.

In operation, system 1000 allows relational data to be stored for a hierarchical organization of nodes, such as to facilitate the distribution of software in an enterprise, the identification of functions performed by nodes, or for other suitable purposes. System 1000 allows a relational database and a hierarchical database to be coordinated to facilitate such functions.

Figure 11:
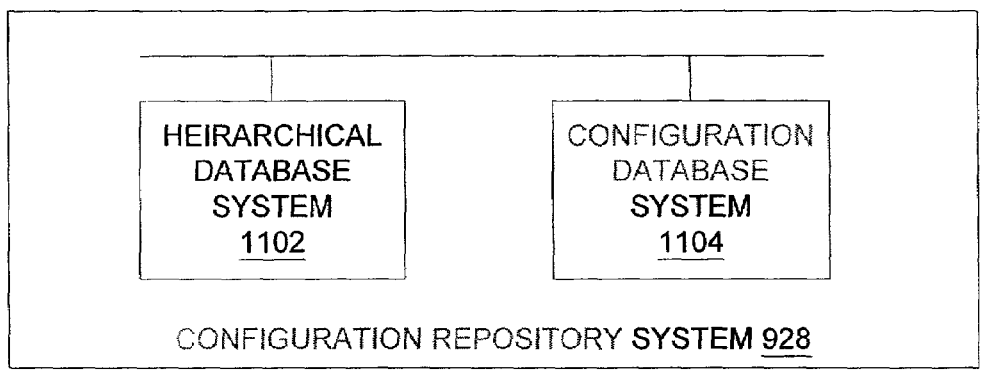
FIG. 11 is a diagram of a system for providing configuration repository functions in accordance with an exemplary embodiment of the present invention.

FIG. 11 is a diagram of a system 1100 for providing location profile functions in accordance with an exemplary embodiment of the present invention. System 1100 includes Configuration Repository system 928, hierarchical database system 1102 and location database system 1104, each of which can be implemented in hardware, software, or a suitable combination of hardware and software, and which can be one or more software systems operating on a general purpose server platform.

Hierarchical database system 1102 is a hierarchical database generated using the lightweight directory access protocol or other suitable directory access protocols or hierarchical protocols. Hierarchical database system 1102 allows a hierarchical directory driven database to be generated in a top down manner, such as by determining directories for a given node, and then directories for nodes depending from that node. Hierarchical database system 1102 provides well known advantages for determining hierarchical network relationships, but does not allow relationships that are not directly inherited to be provided for nodes.

Location database system 1104 stores relational data that is synchronized with hierarchical database system 1102. In one exemplary embodiment, location database system 1104 can include hierarchical data, such as data provided by an LDAP and additional data, such as association data, collection data, application data, user data, miscellaneous data, or other nonhierarchical data that is related to nodes in a manner such that nodes can inherit the data in a bottom up manner, as opposed to the top down manner of a hierarchical database. Location database system 1104 can further be synchronized with the hierarchical database of hierarchical database system 1102, such as to identify changes in the hierarchical structure of data stored in hierarchical database system 1102 and to flag such changes for attention by an operator. In this exemplary embodiment, if an end point node is moved from a first server to a second server, then the corresponding changes to the hierarchical database can cause notification data to be generated through location database system 1104, so as to alert the operator to reconfirm the relational data for that end point node, to confirm that the end point node is still located in a associated room, is associated with a particular organization, particular user, particular applications, or other suitable relational data. Likewise, where such relational data can be assigned on a room basis, a floor basis, an organization basis, or in other suitable manners, inheritance of the relational data can be assigned using a bottom up relationship, such as where all nodes within a room are known to be providing certain functions, to be associated with a particular association, particular user, or other similar relational data. In one exemplary embodiment, the hierarchical database of hierarchical database system 1102 can be synchronized with location database system 1104, such as to maintain identical sets of data at distributed nodes and a central node or other suitable node.

Figure 12:
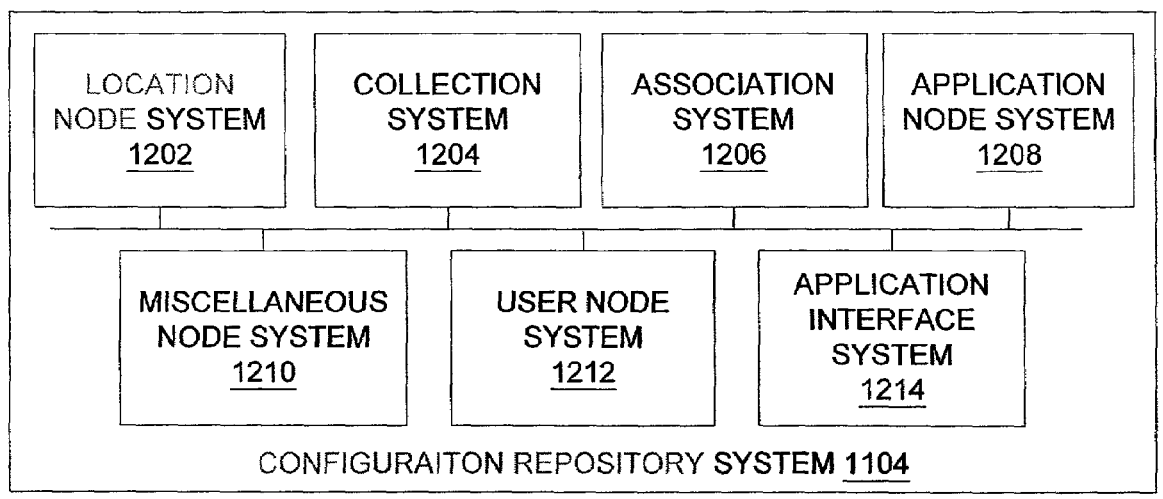
FIG. 12 is a diagram of a system for providing relational database interaction to a hierarchical database in accordance with an exemplary embodiment of the present invention.

FIG. 12 is a diagram of a system 1200 for providing relational database interaction to a hierarchical database in accordance with an exemplary embodiment of the present invention. System 1200 includes configuration repository system 1104 and location node system 1202, collection system 1204, association system 1206, application node system 1208, miscellaneous node system 1210, user node system 1212, and application interface system 1214, each of which can be implemented in hardware, software, or a suitable combination of hardware and software, and which can be one or more software systems operating on a general purpose server platform.

Location node system 1202 stores relational data that is location specific, such as region data, city data, building data, floor data, or other suitable location specific data. Location node system 1202 is configured logically based on node locations, such that if a node is physically moved, it would be necessary to modify the location of the node through profile system 1202.

Collection system 1204 provides relational data for holding multiple values in a specific order. In one exemplary embodiment, the values can define files, settings, or dependencies for a node that is a function of a node's location, a node's associated organization, the user of the node, applications executed by the node, or other suitable data. Thus, changes to any of this relational data can result in notification data being generated for an operator to reconfirm the collection data related to a particular node through collection system 1204.

Association system 1206 stores relational data that can be shared logically by two or more nodes. The relational data can be unrelated to location data. In one exemplary embodiment, the roles a user can play within the organization or the applications that can be installed on a node based on its organizational location can be stored in association system 1206.

Application node system 1208 stores relational data for application specific implementation, such as buffer sizes for communication, a default number of retries, a default location for log files, or other suitable application specific data. In this exemplary embodiment, application node system 1208 can be configured for all users of an application. In one exemplary embodiment, a room can hold a secretary and an engineer, such as where the secretary will have a first set of functions based upon the organization that the secretary is in, and where the engineer will have a second set of functions based upon the organization that the engineer is in. Thus, the roles that the user plays or the applications that the machine can have would be related to the specific node. Likewise, the end points serviced by a given server may be secretarial, such that the association information can be associated to the hierarchical database location for the server node. Thus, the relational database information for association system 1206 can be assigned logically to a physical node based on various factors, such that any changes to that physical node may require generation of notification data for operators to confirm the association system 1206 relational data.

Miscellaneous node system 1210 holds data that does not fit into other categories. In one exemplary embodiment an application can store menu structure data in this branch, such that changes made to the menu structure will change the menu arrangement of the application dynamically without changing the application code. Likewise, network layout of an organization can be represented within miscellaneous node system 1210, such as where the network layout can span several geographical regions.

User node system 1212 holds user preferences, such as user-selected window size data, user-selected window location data, user-selected window color data, or other suitable data. For example, user node system 1212 allows users to be relocated to different nodes without losing user-selected preferences.

Application interface system 1214 provides one or more application programming interfaces to query data elements, where such application programming interfaces navigate the node hierarchy in a bottom up direction. In this exemplary embodiment, the application programming interface elements note the machine from which the query is performed and retrieve the data with respect to the machine's location in the hierarchical database and relational database. Thus, application interface system 1214 can also generate notification data when such application programming interface queries are affected by changes to the relational database.

In operation, system 1200 allows relational data to be associated with the hierarchical data stored in a relational database in a manner that facilitates centralized processing of data, such as centralized distribution of software in an enterprise, centralized monitoring of functions being performed (such as to update flight times displayed on a monitor based on the gate that the monitor is associated with) or other suitable functions. System 1200 further allows the relational data to be logically associated to a suitable node, such that the bottom up traversal performed by application programming interfaces can be simplified to require the least number of modifications in the event of relocation of nodes, relocation of users, modification of applications, distribution of new applications, or other suitable changes to the configuration of nodes in an organization.

FIG. 13 is a flow chart of a method 1300 for generating relational data and associating the relational data to an hierarchical database in accordance with an exemplary embodiment of the present invention. Method 1300 allows location data, organizational data, user data, application data or other relational data that is not hierarchical to be associated with nodes in an hierarchical database, in a manner that minimizes the need for modification of such data when nodes are relocated, when functions for nodes are redefined, or resulting from other similar changes.

Method 1300 begins at 1302 where a hierarchical database and a relational database are generated. In one exemplary embodiment, an LDAP database or other suitable database can be used as the hierarchical database, such as one generated in a top down organization starting from a centralized node and going to lower layers of nodes until the bottommost layer of end points is reached. The method then proceeds to 1304.

At 1304, profile data is defined for each node. In one exemplary embodiment, the profile data can include location profile data that includes room data, floor data, building data, city data, country data, or other suitable location profile data, where the node association of the profile data is based on a reverse lookup paradigm. The method then proceeds to 1306. At 1306 the profile data is related to the hierarchical data stored in the relational database, such as by assigning physical location data to end points, servers, or other suitable nodes. In another exemplary embodiment, when profile data has previously been defined, an updated relational database can be synchronized with the existing profile data at 1306, and notification data can be generated if changes in the hierarchical data stored in the relational database have occurred that may require the relational data to be redefined. The relational database can then be replicated to the hierarchical database. The method then proceeds to 1308.

At 1308, association data is defined for each node. In one exemplary embodiment, the association data can include role data for a user within an organization, applications that can be installed on a node, or other suitable association data, where the node association of the association data is based on a reverse lookup paradigm. The method then proceeds to 1310. At 1310 the association data is related to the hierarchical data stored in the relational database, such as by assigning association data to end points, servers, or other suitable nodes. In another exemplary embodiment, when association data has previously been defined, an updated relational database can be synchronized with the existing association data at 1310, and notification data can be generated if changes in the hierarchical data stored in the relational database have occurred that may require the relational data to be redefined. The relational database can then be replicated to the hierarchical database. The method then proceeds to 1312.

At 1312, collection data is defined for each node. In one exemplary embodiment, the collection data can include multiple data values stored in a predetermined order, such as for installation or operation of software applications or other suitable functions, where the node association of the collection data is based on a reverse lookup paradigm. The method then proceeds to 1314. At 1314 the collection data is related to the hierarchical data stored in the relational database, such as by assigning collection data to end points, servers, or other suitable nodes. In another exemplary embodiment, when collection data has previously been defined, an updated relational database can be synchronized with the existing collection data at 1314, and notification data can be generated if changes in the hierarchical data stored in the relational database have occurred that may require the relational data to be redefined. The relational database can then be replicated to the hierarchical database. The method then proceeds to 1316.

At 1316, miscellaneous data is defined for each node. In one exemplary embodiment, the miscellaneous data can include data sets that do not fit with other sets, such as to allow an application to store its menu structure in a manner that allows the menu arrangement of the application to be changed without changing the application code, to store the network layout of an organization that spans several geographical regions, or other suitable data, where the node association of the collection data is based on a reverse lookup paradigm. The method then proceeds to 1318. At 1318 the miscellaneous data is related to the hierarchical data stored in the relational database, such as by assigning miscellaneous data to end points, servers, or other suitable nodes. In another exemplary embodiment, when miscellaneous data has previously been defined, an updated relational database can be synchronized with the existing miscellaneous data at 1318, and notification data can be generated if changes in the hierarchical data stored in the relational database have occurred that may require the relational data to be redefined. The relational database can then be replicated to the hierarchical database. The method then proceeds to 1320.

At 1320, application data is defined for each node. In one exemplary embodiment, the application data can include application-specific data, such as a buffer size for communication, a default number of retries, a default location for log files, or other suitable data, where the node association of the application data is based on a reverse lookup paradigm. The method then proceeds to 1322. At 1322 the application data is related to the hierarchical data stored in the relational database, such as by assigning application data to end points, servers, or other suitable nodes. In another exemplary embodiment, when application data has previously been defined, an updated relational database can be synchronized with the existing application data at 1322, and notification data can be generated if changes in the hierarchical data stored in the relational database have occurred that may require the relational data to be redefined. The relational database can then be replicated to the hierarchical database. The method then proceeds to 1324.

At 1324, user data is defined for each node. In one exemplary embodiment, the user data can include user-selected window size data, user-selected window location data, user-selected window color data, or other suitable data, where the node association of the user data is based on a reverse lookup paradigm. The method then proceeds to 1326. At 1326 the user data is related to the hierarchical data stored in the relational database, such as by assigning user data to end points, servers, or other suitable nodes. In another exemplary embodiment, when user data has previously been defined, an updated relational database can be synchronized with the existing user data at 1326, and notification data can be generated if changes in the hierarchical data stored in the relational database have occurred that may require the relational data to be redefined. The relational database can then be replicated to the hierarchical database.

In operation, method 1300 allows relational data to be associated to nodes in the hierarchical data stored in a relational database, such as to provide bottom up hierarchical location of data relevant to nodes based on the location of the node, the function of the node, the organization in which node is being used, the user of the node, or other suitable functions. Method 1300 also allows notification data to be generated when hierarchical data is synchronized to the relational database, such as when changes in the hierarchical location of nodes require operator reassessment of the relational database for that node.

Although exemplary embodiments of a system and method for performing the present invention have been described in detail herein, those skilled in the art will also recognize that various substitutions and modifications can be made to the systems and methods without departing from the scope and spirit of the appended claims.

What is claimed is:

1. A system for providing location data, the system comprising:
   a memory to store the location data;
   a processor coupled to the memory;
   a hierarchical database system to store network hierarchical database for plurality of nodes, wherein the network hierarchical database is an Lightweight Directory Access Protocol (LDAP) database;
   a configuration repository system to store a relational database associated with the network hierarchical database and to identify updates to the network hierarchical database, wherein the relational database comprises nonhierarchical data and hierarchical data, the configuration repository system further comprises one or more application programming interfaces to provide interface functionality to the network hierarchical database of the hierarchical database system, and in response to at least a request for the nonhierarchical data for one of the plurality of nodes, the one or more application programming interfaces execute a bottom-up search of the network hierarchical database to identify related nodes, and for each identified node, to evaluate the nonhierarchical data stored in the relational database to determine the requested nonhierarchical data is stored at a location of a parent node of the one of the plurality of nodes, wherein the configuration repository system is to further store profile data containing the location data, wherein the evaluating further includes evaluating data fields of the related nodes to determine a data field at a location of the parent node in associated relational database location;
   wherein the profile data is organized to allow reverse inheritance of data elements so that a node hierarchy of the hierarchical database system is traversed from bottom up until a requested data element is found; and
   a component to allow a menu arrangement of an application to be changed without changing application code, to allow storing of a network layout of an organization that spans geographical regions, and to synchronize an updated relational database of the configuration repository system with miscellaneous data that has previously been defined, wherein the application is executed on the nodes, wherein the miscellaneous data is related to the hierarchical data stored in the relational database.

2. The system of claim 1 wherein the configuration repository system further comprises a collection system to store data value sets.

3. The system of claim 1 wherein the configuration repository system further comprises an application node system to store application specific data.

4. The system of claim 1 wherein the configuration repository system further comprises a user node system to store user specific data.

5. A method for providing location data for a processor, the method comprising:

generating, by using a computer, a hierarchical database of hierarchical location data for nodes of profile data in a network, wherein the generating the hierarchical database of hierarchical location data for the nodes of the profile data in the network comprises generating an Lightweight Directory Access Protocol (LDAP) database;

generating a relational database for the nodes of the profile data including relational association location data, the profile data associated with the hierarchical location data, wherein the generating the relational database for the nodes of the profile data comprises generating relational data sets of ordered data, the relational database configured to identify updates to the hierarchical location data, wherein the profile data is organized to allow reverse inheritance of data elements so that a node hierarchy is traversed from bottom up until a requested data element is found, wherein the relational database comprises nonhierarchical data and hierarchical data;

synchronizing updated relational data with miscellaneous data when the miscellaneous data has previously been defined, wherein the miscellaneous data is related to the hierarchical data stored in the relational database;

locating a data field associated with a node using an application programming interface that navigates the hierarchical database from a location of a node upwards to a parent node to evaluate data fields of related nodes to determine the data field at a location of the parent node in an associated relational database location;

in response to at least a request for the nonhierarchical data for one of the plurality of nodes, executing, by application program interfaces, a bottom-up search of the hierarchical database to identify the related nodes and for each identified node, evaluating the nonhierarchical data stored in the relational database to determine the requested the nonhierarchical data is stored at a location of a parent node; and allowing a menu arrangement of an application to be changed without changing application code, and storing a network layout of an organization that spans geographical regions, wherein the application is executed on the nodes.

6. The method of claim 5 wherein generating the relational database for the nodes of the profile data comprises generating relational physical location data.

7. The method of claim 5 wherein generating the relational database for the nodes of the profile data comprises generating relational application data.

8. The method of claim 5 wherein generating the relational database for the nodes of the profile data comprises generating relational user-specific data.

* * * * *